US005605216A

United States Patent [19]

Raybon et al.

[11] Patent Number: 5,605,216

[45] Date of Patent: Feb. 25, 1997

[54] BOARD TURNING APPARATUS

[75] Inventors: Christopher Raybon; Russell R. Kennedy; L. Charles Gaither; Patrick M. Conry, all of Hot Springs, Ark.

[73] Assignee: Hi-Tech Engineering Inc., Hot Springs, Ark.

[21] Appl. No.: 366,584

[22] Filed: Dec. 30, 1994

[51] Int. Cl.$^{6}$ .................................................. B65G 47/252

[52] U.S. Cl. .......................... 198/395; 198/399; 144/357; 144/378

[58] Field of Search .................................... 198/395, 399, 198/401, 402, 403; 209/518, 521, 700; 414/222, 677, 936; 144/356, 357, 377, 378

[56] References Cited

U.S. PATENT DOCUMENTS

| | | | |
|---|---|---|---|
| 3,519,045 | 5/1970 | Blickenderfer, Jr. et al. . | |
| 3,890,509 | 6/1975 | Maxey | 144/357 X |
| 3,983,403 | 9/1976 | Dahlstrom et al. | 144/357 X |
| 4,139,035 | 2/1979 | Bystedt et al. . | |
| 4,166,029 | 8/1979 | Rhotert | 209/518 |
| 4,186,310 | 1/1980 | Maxey | 144/357 X |
| 4,196,648 | 4/1980 | Jones et al. . | |
| 4,281,696 | 8/1981 | Howard et al. . | |
| 4,316,491 | 2/1982 | Kearnes et al. . | |
| 4,365,704 | 12/1982 | Stenvall . | |
| 4,413,662 | 11/1983 | Gregoire et al. | 144/356 |
| 4,462,443 | 7/1984 | Allen . | |
| 4,471,823 | 9/1984 | Wadell . | |
| 4,484,675 | 11/1984 | Doherty et al. | 198/403 X |
| 4,515,196 | 5/1985 | Shields . | |
| 4,799,613 | 1/1989 | Adamson | 198/399 X |
| 4,800,938 | 1/1989 | Coombs . | |
| 4,823,664 | 4/1989 | Cooper, Jr. et al. . | |
| 4,867,213 | 9/1989 | Bolton et al. . | |
| 4,907,686 | 3/1990 | Cotic | 198/403 X |
| 4,934,228 | 6/1990 | Bolton et al. . | |
| 4,936,437 | 6/1990 | Gearhart | 198/403 |
| 4,984,172 | 1/1991 | Luminari . | |
| 5,042,341 | 8/1991 | Greten et al. . | |
| 5,088,363 | 2/1992 | Jones et al. . | |
| 5,099,896 | 3/1992 | Ritola . | |
| 5,135,037 | 8/1992 | Wijesinghe . | |
| 5,201,354 | 4/1993 | Weissbeck . | |
| 5,412,220 | 5/1995 | Moore | 198/403 X |

FOREIGN PATENT DOCUMENTS

| | | | |
|---|---|---|---|
| 3512395 | 10/1986 | Germany | 209/518 |

*Primary Examiner*—David A. Bucci
*Assistant Examiner*—Scott L. Lowe
*Attorney, Agent, or Firm*—Cushman Darby & Cushman IP Group of Pillsbury Madison & Sutro LLP

[57] ABSTRACT

A board turning apparatus is provided with a conveyor for transporting a board through an inspection station; the inspection station includes an array of photocells located below the conveyor and which operate to detect and scan the facing surface of a board as it passes over the photocell or is held in the inspection station by a detent arm; the output of the scan by the photocell array is delivered to a computer having an analyzing program for detecting discoloration in the surface or edges of the board that are scanned by comparing the scan to a set of conditions stored in the computer; a turning arm is connected to the computer and is actuated to engage an edge of the board and turn the board over by rotating it about its opposite edge on the conveyor to turn over the board to facilitate and optimize subsequent operations on the board such as edging of the board.

13 Claims, 4 Drawing Sheets

BOARD TURNING APPARATUS

FIELD OF THE INVENTION

The present invention relates to lumber handling and orienting apparatus and, more specifically, to an automatic scanning and board turning apparatus which will rapidly detect the condition of the surface and presence of a board to enable a computer operation to determine whether a particular board being inspected should be turned over for a subsequent operation such as edging and the like.

BACKGROUND OF THE INVENTION

In present day sawmills, raw lumber usually in the form of delimbed tree trunks are delivered to a section of a sawmill for cutting the trunks into boards having flat opposite faces and usually rough edges which must be removed by edging before the boards are finished. Presently, the boards are fed to an edging station where any roughened edges of a board are to be trimmed. However, for the sake of efficiency and speed, it is necessary that the operator inspect each board to determine which side of the board should be facing upwardly before feeding the board to the edging station. Clearly, in modern sawmills and lumber handling operations, physical inspection by a worker of each board will not only slow down the production throughput of the line but can also lead to a number of quality control errors due to the pressure resulting from the speed of the operation and the tedium of the inspection function. Accordingly, in order to increase quality control, operators have been required to slow down the throughput speed of the board conveyors to allow adequate inspection as well as turning of a selected board over so that the appropriate face, such as the wane face, is directed upwardly to allow the appropriate sections to be trimmed, chipped or sawn off as it is edged.

One system for dealing with this difficulty is to use video equipment to allow an operator to manually detect the orientation and quality of each board and to manually reorient it by mechanical devices for turning the board. The problem with this solution is that every board must still be inspected by the operator so that the throughput speed is still unacceptably compromised.

SUMMARY OF THE INVENTION

The present invention overcomes the foregoing difficulty by providing an automatic detection of each board as it passes into an inspection station by providing an array of electronic detecting and inspecting photodetectors spaced apart along the lengthwise dimension of a board so that the array of photocells will simultaneously inspect each adjacent portion of the board and provide a readout to a central processing unit. Preferably, the board in the inspection station will be illuminated by one or more lasers and the photodetectors will each be provided with an appropriate focal length camera lens to assure complete scanning of an adjacent portion of the board surface. Typically, in such installations, the top and bottom surfaces are scanned in the inspection station. If desired, use of the present invention may eliminate the necessity of dual surface scanning equipment as will become apparent from the following description. The CPU will analyze the data from the photocell array and determine immediately whether or not the inspected board requires reorientation such as turning over of the board on the conveyor so that the side of the board with defects, such as an uneven side egde, is facing upwardly to facilitate accurate edging at the edging facility which is downstream of the inspection station and the turning station. With this arrangement, when the photocell array fails to detect any defects in the board as it enters the inspection location, no reorientation is effected and, as a consequence, a material increase in production throughput will be achieved.

The foregoing and other advantages of the present invention will become apparent as consideration is given to the following detailed description taken in conjunction with the accompanying drawings in which:

DETAILED DESCRIPTION OF THE INVENTION

Figure 1:
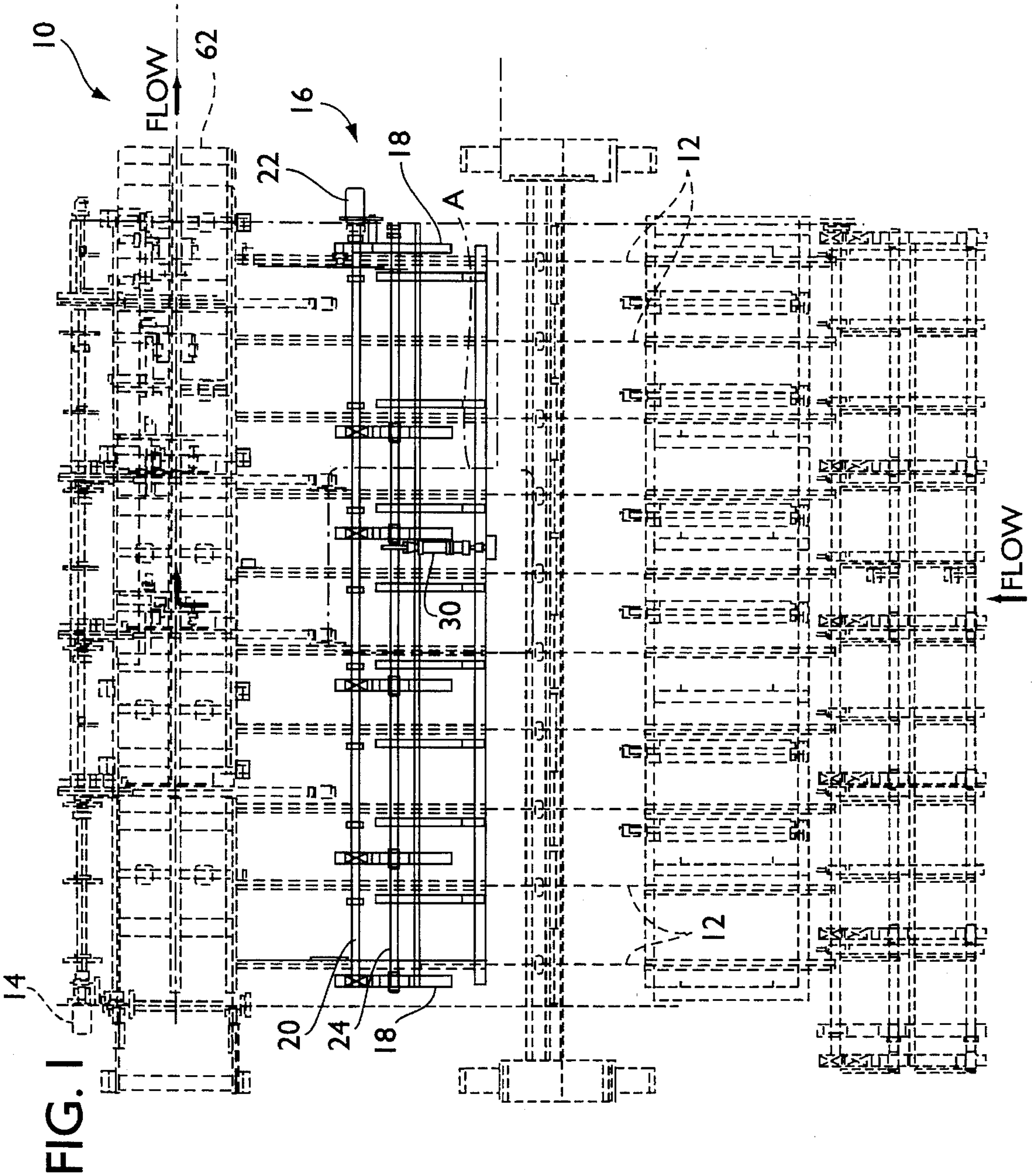
FIG. 1 is a top plan, schematic view of a board handling facility with the turning station installed downstream of an inspection station.

Referring now to the drawings wherein like numerals designate corresponding parts throughout the several views, there is shown in FIG. 1 a portion 10 of a board transporting conveyor system. As is conventional, conveyor system 10 will employ a plurality of parallel extending chains some of which are indicated at 12. As is customary, each chain is supported on spaced apart pulleys and typically the chains are of the sprocket type which cooperate with the teeth or sprockets on the pulley, one or more of which are driven by a motor such as the one indicated at 14 to continuously move the chains to carry a board through the various work stations of a sawmill. In the illustrated embodiment of FIG. 1, the conventional conveying elements are shown in pale lines and the inspection station is indicated at 15 while the board turning station of the present invention is shown in solid lines at 16.

The inspection station 15 may be of conventional structure and include a support beam 17 with an identical beam (not shown) located below the conveyor path to allow simultaneous inspection of both surfaces of a board on the chains 12. Such inspections stations are commercially available and include an array of illuminating devices such as lasers which may be mounted to scan a limited portion of the board passing adjacent to the support beams 17. Camera lens will be mounted on the support beams to detect reflected light from the board with the output passed to an associated photocell or similar detector. The output of the photocell array is them passed to a commom CPU 44 (FIG. 3) for analysis.

According to this invention, the CPU 44 will be programmed to control the operation of the board turning station 16 depending on whether the surface of the board that is facing upwardly is the surface desired. Usually, in most edging operations, the wane side should be facing up to facilitate edge trimming while the opposite side is relatively defect free. To this end, a cable 45 from the inspection station output will be connected to an input of the unit 44.

The turning station 16 will preferably comprise, in the present embodiment, a set of frame elements such as post 18 which typically will stand vertically from the floor of the mill. The post 18 will rotatably support a conveyor chain drive shaft 20 which is driven by a motor 22 carried on the outside of the exterior post 18. A second pivot shaft 24 is also rotatably carried by the post 18 such as by journal bearings 26 of a conventional type.

Figure 2:
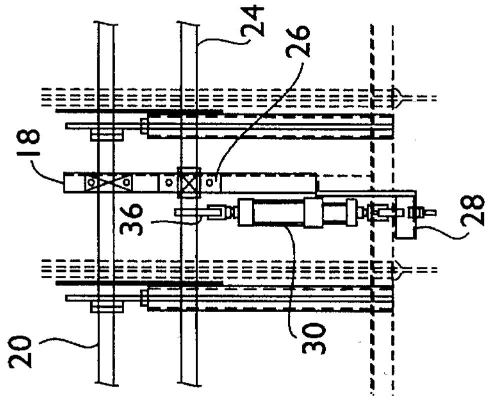
FIG. 2 is a detailed, enlarged view of the segment A of FIG. 1.
Figure 3:
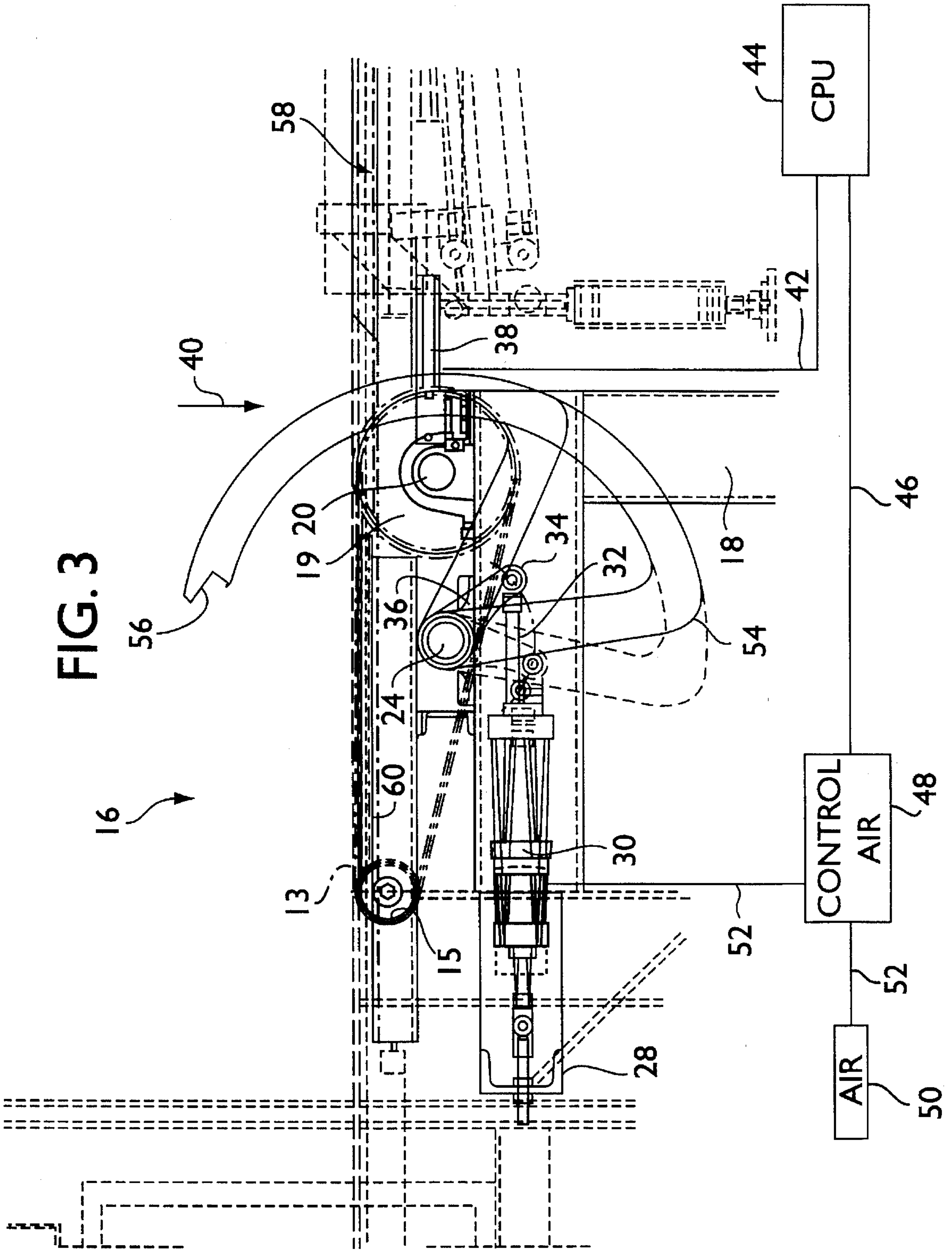
FIG. 3 is a detailed enlarged view of a turning station of the type used in FIG. 1.

As shown in FIGS. 2 and 3, a portion of the frame 28 articulately supports one end of an air piston and cylinder unit 30. In the unit 30, a piston head is mounted for reciprocation and is connected to a piston rod 32 which is pivotally connected by pin 34 to a free end of a crank arm 36, the opposite end of which is fixedly mounted on pivot shaft 24. A chain conveyor 13 takes up individual boards being fed from the chain conveyors 12 into the inspection station 16. Each chain of conveyor 13 is typically mounted on spaced apart pulleys 15 and 19 with the pulley 19 being driven by the drive shaft 20.

According to this embodiment, there is mounted an array of photocells, one of which is shown at 38, slightly downstream in the direction of travel of the boards of the drive shaft 20. Preferably, the photocells are of the type that will detect the presence of the leading edge of a board at the point 40 in its travel along the conveyor chains 13. With this arrangement, the upstream inspection station having performed its scan will pass a signal to the unit 44 corresponding to a decision to turn a selected board over. When a subjacent photocell 38 detects the presence of the board, a signal to commence turning will be passed to the unit 44 and turning will be effected as desribed below.

According to the present invention, the output of each photocell 38 will be passed through a cable or line 42 to a central processing unit 44 which will have been programmed to receive a command signal from station 15 and wait for the presence signal one or several photocells 38. When the selected set of conditions are satisfied in the analysis performed by the analyzing software of the CPU 44, no signal will be passed along line 46 to a control device such as a valve unit 48 and the board in the turning station 16 at the time of the detection by the photocell 38 will be passed without turning. However, in the event that the inspection station detects a set of conditions corresponding, for example, to uneven side edges or even discoloration indicative of a defect which conditions are stored in the memory of the CPU unit 44, the CPU will issue a signal along line 46 to the air control device 48 which will thereby open a valve from a supply 50 to allow pressurized air or fluid to pass through lines 52 to the cylinder piston unit 30.

To effect turning of a board upon detection of the selected information, a turning arm 54 has one end fixedly mounted on pivot shaft 24. Preferably, the fixed end extends perpendicularly from the axis of the pivot shaft 24 a selected distance and then curves arcuately as shown in FIG. 3 for the purpose of assuring accurate turning of a board once the board has engaged the notch 56 located at the free end of the turning arm 54 whenever the unit 30 is actuated. The movement of the arm 54 from its retracted position where the notch or shoulder 56 is below the plane 58 of travel of the boards may be effected where the photocells 38 detect the leading edge of a board at the position of board 60 in FIG. 3. The notch 56 will then move to the dotted line position of FIG. 3 where the shoulder will engage and retain the board 60 while the inspection is completed and the data analyzed. Thereafter, when it is determined that the board should be turned so that the wane side is facing upwardly, the CPU will actuate the air control device 48 to deliver additional fluid to the cylinder unit 30 to move the arm 54 sufficiently to tip the board over by rotating it about its trailing edge at the inspection station 16.

From the inspection station 16, the boards will be passed to a transverse feed conveyor shown in pale lines at 62 in FIG. 1.

Figure 4:
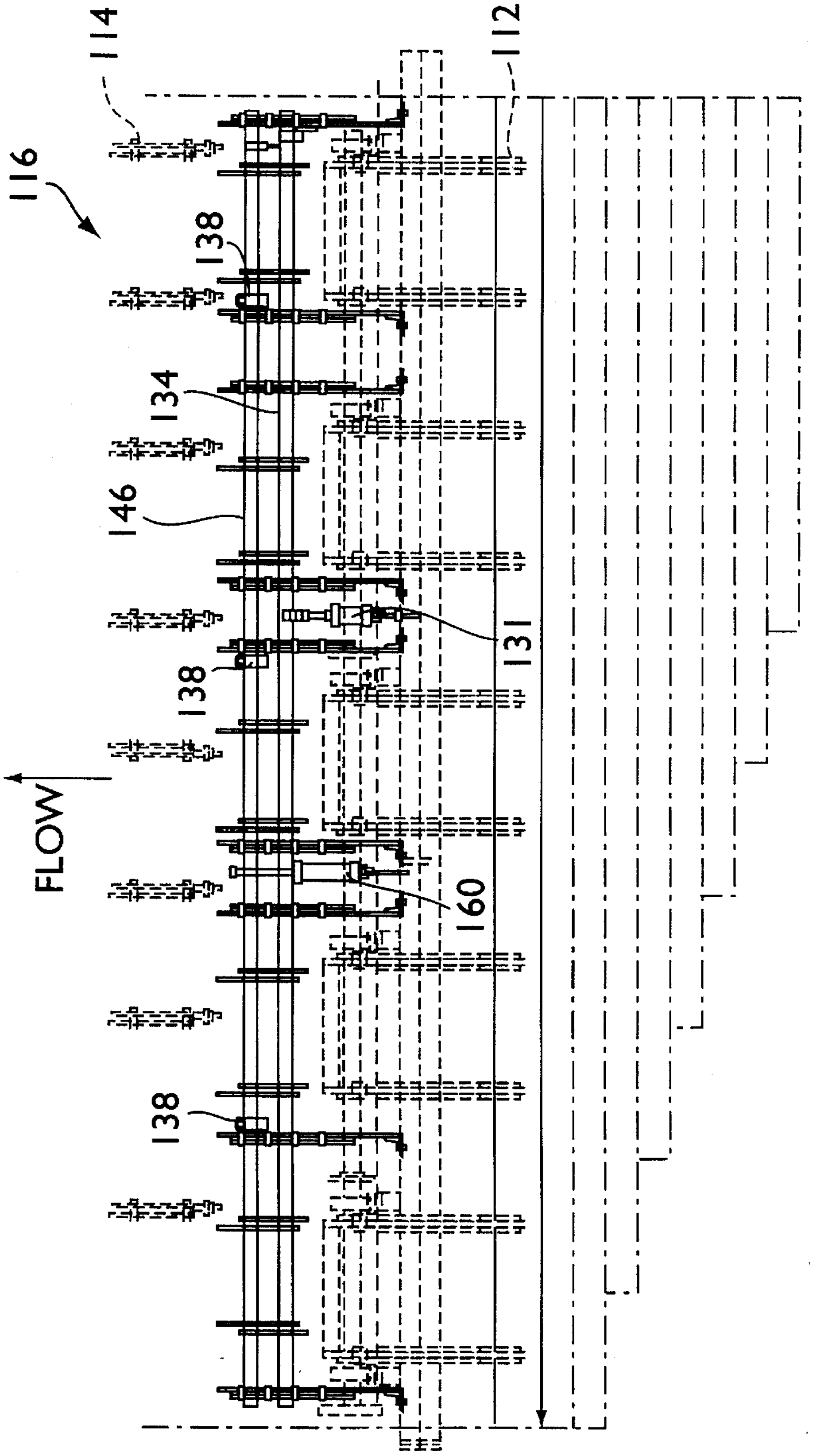
FIG. 4 is a top plan schematic view of another form of the board orienting apparatus of the present invention.
Figure 6:
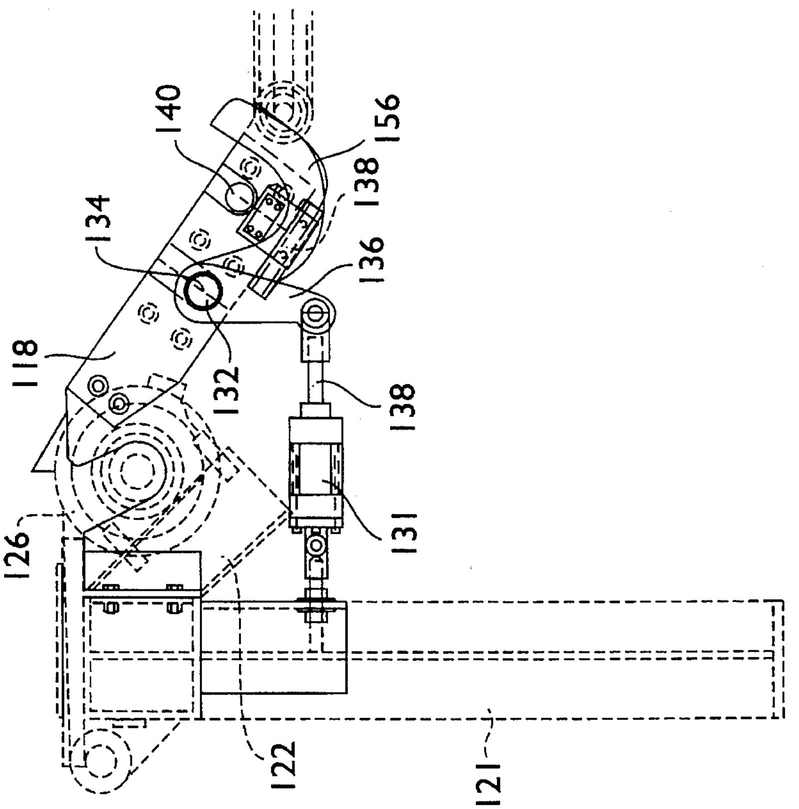
FIG. 6 is a board holding mechanism used in the installation of FIG. 4.
Figure 5:
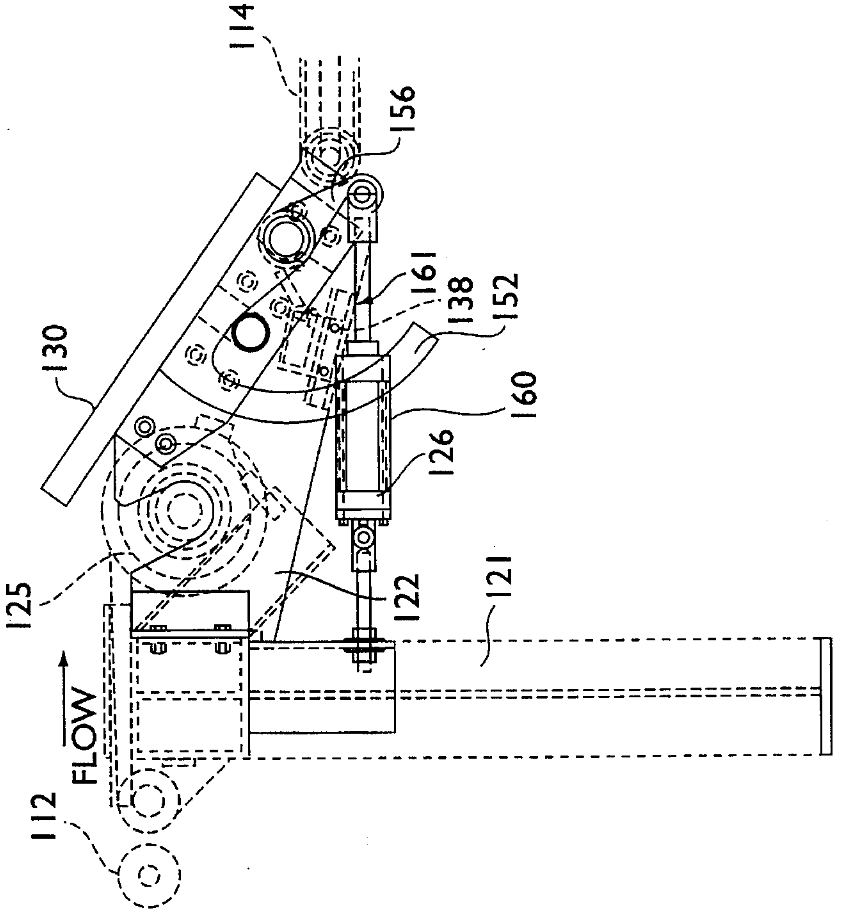
FIG. 5 is an elevational view of a board turning device used in the station of FIG. 4.

With reference to FIGS. 4, 5 and 6, there is shown another embodiment of the present invention and features common with the embodiment of FIGS. 1–3 have not been repeated for clarity. Common elements that are illustrated bear the same numerals but raised by 100. The same inspection station 15 will, of course, be installed upstream of the turning station 116. The embodiment of the turning station 116 includes an infeed conveyor system 112 and a downstream transport conveyor 114.

Unlike the previous embodiment, the plane of operation of the two conveyors 112 and 114 are at different vertical heights above the support floor as shown in FIGS. 5 and 6. To accommodate the difference in height, the embodiment of the present invention utilizes a fixed plate 118 which is mounted on a post 121 by means of a bracket arm 122. An infeed conveyor shown schematically at 125 is employed to feed individual boards over the sprocket wheel 126 until the board 130 assumes the position illustrated in FIG. 5. As shown in FIG. 6, a hook arm 156 is employed to retain the board 130 on the face of the plate 118 as shown in FIG. 5. As will be apparent from a consideration of FIG. 4, a plurality of hook arms 156 are provided at each of the turning stations 116 and are substantially evenly spaced along the width of the conveyor systems 112 and 114. Each of the plates 118 is provided with spaced apart apertures with the upstream aperture 132 rotatably supporting a pivot shaft 134 to which is fixedly attached one end of the hook arm 156. A crank arm 136 is securely fixed on the pivot shaft 134 with the free end of the crank arm attached to a piston rod 138 of a piston unit 131. The other end of the piston unit 131 is articulatedly supported on the bracket 122, as schematically shown in FIG. 6. As more clearly shown in FIG. 5, photocells, one of which is indicated at 138, are positioned immediately beneath the shaft 134 but offset relative thereto as shown in FIG. 4.

A second aperture 140 is provided in each of the plates 118 and which rotatably supports a second pivot shaft 146 along the width of the conveying system. Fixedly attached to the second pivot shaft 146 is a turning arm 152 which has a crank arm extension 156 pivotally connected to piston rod 161 of piston unit 160. With this arrangement, a CPU unit, air control device, air supply unit and control lines similar to that shown in FIG. 3 may be employed with the simple modification that each of the piston and cylinder units 131 and 160 will of course be operable in response to detection of the same type data by the photocell 138. For example, operation of the hook arm 156 will be actuated by the CPU unit controlling the air control device upon detection of the presence of a board on the plate 118 but only after a turn decision has been made resulting from data received from the upstream inspection station. In this circumstance, the piston 131 will be extended to move the hook arm up to the position shown in FIG. 6. As shown in FIG. 4, actuation of the unit 131 will pivot the shaft 134 to thereby bring each of the hook arms 156 to the actuated position as shown in FIG. 6. If no defects in the board surface or edge are detected, the piston unit 131 will not be actuated to move the hook arm 156 thereby allowing the board to move to the take away conveyor 114. In the event, however, that defects of a selected quantity and quality are detected by the inspection station, the CPU unit will operate piston and cylinder unit 160 to pivot arm 152 to turn the board 130 over about its leading edge for the reasons mentioned above in connection with the embodiment of FIGS. 1–3.

To assure smooth passage of the boards through the inspection stations, the motors of the several conveyor systems may all be of a variable speed type with the speed controlled by the CPU or another CPU linked to the photocells 30 or 130. Thus, where the timing of the arrival of a board at the inspection station decreases below a preset limit, for example, the CPU will operate under a suitable program module to slow down an upstream conveyor motor. Conversely, a downstream or other photocell or set of photocells may be employed to detect arrival of boards downstream of the inspection station and adjust the appropriate conveyor system's motor to compensate.

Having described the invention, it will be apparent to those skilled in this art that various modifications may be made thereto without departing from the spirit and scope of this invention as defined in the appended claims.

What is claimed is:

1. An apparatus for inspecting and orienting moving wood boards having opposite side edges for subsequent operations on each wood board comprising a conveyor for moving the wood boards sequentially along a travel path, an inspection station positioned adjacent said path at a first location, said inspection station including a photoelectric device for scanning a surface of a wood board as the wood board passes through said first location and providing an electronic data output, an analyzing device for receiving said output from said photoelectric device and comparing said output to a set of conditions stored in said analyzing device, said analyzing device providing a control signal in response to a selected correspondence between said output and said set of conditions, an orienting device located adjacent said first location along said path, a control device operably connected to said orienting device for actuation of said orienting device upon receipt of a said control signal from said analyzing device, said orienting device comprising a pivot means for turning a board over on said conveyor upon receipt of a said control signal.

2. The invention as claimed in claim 1 wherein said conveyor comprises a plurality of endless chains each installed about at least one pair of pulleys and spaced apart in a direction transverse to the travel path, said apparatus including a common drive for said plurality of endless chains.

3. The invention as claimed in claim 2 wherein said apparatus includes a frame and said pivot means comprises a pivot shaft rotatably mounted on said frame, a pivot arm having a first end fixedly mounted on said pivot shaft and a second end remote from said first end, said conveyor extending in a generally horizontal plane, said pivot shaft being disposed vertically below said plane a selected distance, said orienting device including at least one piston and cylinder unit with said piston of said unit having a rod connected to said pivot shaft through a crank arm so that, upon actuation of said piston and cylinder unit, said pivot shaft will be rotated to rotate said pivot arm from a retracted position to an extended position where said pivot arm will pass at least partly above said plane and engage a portion of a board to rotate the thus engaged board about an edge thereof to turn over the board.

4. The invention as claimed in claim 3 wherein said pivot arm has a first portion extending substantially perpendicularly from said pivot shaft and a distal end from which extends an arcuate second portion having a concave side facing the travel path of the boards on said conveyor when in said actuated position.

5. The invention as claimed in claim 1 wherein said photoelectric device comprises a plurality of photocells disposed in spaced apart positions transverse to the direction of said travel path of said conveyor.

6. The invention as claimed in claim 5 wherein said orienting device includes a pivot shaft and the surface of each board on said conveyor has a leading edge and a trailing edge relative to the direction of travel of the board and a selected width, each said photocell being located vertically below said conveyor downstream of said pivot shaft so that at least one of said photocells will detect a said leading edge and send a signal to said analyzing device corresponding to the presence of a board above said respective photocell, each said photocell being located a distance upstream of said pivot shaft such that the trailing edge of a board will be located upstream of said orienting device.

7. The invention as claimed in claim 6 wherein said inspection station is upstream of said orienting device.

8. The invention as claimed in claim 7 wherein said conveyor moves each board with one of the edges positioned as a leading edge and each said photocell is positioned to scan the leading edge of each board and provide a signal upon detection of a board.

9. An apparatus for inspecting and orienting moving articles for subsequent operations on each article comprising a first conveyor for moving the articles sequentially along a travel path, an inspection station positioned adjacent said path at a location to receive articles from said first conveyor, a second conveyor for removing articles from said inspection station, said inspection station including a photoelectric device for scanning a surface of an article when the article enters said inspection station and providing an electronic data output, an analyzing device for receiving said output from said photoelectric device and comparing said output to a set of conditions stored in said analyzing device, said analyzing device providing a control signal in response to a selected correspondence between said output and said set of conditions, an orienting device located adjacent to said inspection station, a control device operably connected to said orienting device for actuation of said orienting device upon receipt of a said control signal from said analyzing device, said orienting device including an article engaging arm movable between an actuated and a deactuated position and a turning arm also movable between an actuated and deactuated position, said first conveyor extending in a first plane and said second conveyor extending in a second plane located vertically below said first plane, said inspection station including a plurality of article supporting, fixed plates each having a substantially flat surface extending at an angle between said planes of said first and second conveyors.

10. The invention as claimed in claim 9 wherein said appartus includes a frame, a first pivot shaft extending transversely across said travel path and having opposite ends rotatably supported by said frame and being rotatably supported in first apertures provided in each said fixed plate, said apparatus including a plurality of said article engaging arms spaced apart along and supported by said first pivot shaft so as to be rotatable therewith.

11. The invention as claimed in claim 10 wherein said apparatus includes a second pivot shaft extending transversely across said travel path and having opposite ends rotatably supported by said frame and being rotatably supported in second apertures provided in each said fixed plate, said first and second apertures being spaced apart in each said plate, said apparatus including a plurality of said turning arms each spaced apart along and supported by said second pivot shaft so as to rotatable therewith.

12. The invention as claimed in claim 11 wherein said orienting device includes a plurality of piston and cylinder units, at least one of said units being operably connected to said first pivot shaft and another of said units being operably connected to said second pivot shaft, said units being connected to said respective shafts by respective crank arms each having one end fixedly connected to said respective shaft, said control device being connected to each said piston and cylinder unit to provide separate actuating signals to said unit connected to said first pivot shaft and to said unit connected to said second pivot shaft so that said control device will operate to actuate said one of said units each time an article is present on said plates to move said article engaging arms to retain the article on said plates while the article is turned.

13. The invention as claimed in claim 12 wherein the articles are wood boards having opposite side edges and said article engaging arm operates to engage a leading side edge and when said turning arm is actuated, the board is turned over about said leading edge.

* * * * *